United States Patent [19]
Gerback

[11] Patent Number: 5,705,782
[45] Date of Patent: Jan. 6, 1998

[54] INTERNAL COIL SPOT WELDING DEVICE

[76] Inventor: David Gerback, 855 Ohltown Rd., Youngstown, Ohio 44515

[21] Appl. No.: 723,672

[22] Filed: Sep. 30, 1996

[51] Int. Cl.⁶ .............................. B23K 9/12; B23K 9/28
[52] U.S. Cl. .................................... 219/86.9; 219/89
[58] Field of Search ..................... 219/86.21, 86.9, 219/89, 159, 60 A; 228/45

[56] References Cited

U.S. PATENT DOCUMENTS

| | | |
|---|---|---|
| 1,870,577 | 8/1932 | Lamb . |
| 2,495,561 | 1/1950 | Wilson . |
| 3,294,598 | 12/1966 | Norris . |
| 3,319,948 | 5/1967 | Olsen . |
| 3,517,917 | 6/1970 | Winter . |
| 5,079,400 | 1/1992 | Firlotte et al. ................ 219/86.9 |
| 5,177,337 | 1/1993 | Ward ............................. 219/89 |
| 5,632,911 | 5/1997 | Wigle et al. .................. 219/89 |

*Primary Examiner*—Stuart N. Hecker
*Attorney, Agent, or Firm*—Harpman & Harpman

[57] ABSTRACT

A spot welding device to secure the inner end of a coil of steel to itself to prevent uncoiling. The welding device is carried on an articulated support arm assembly that allows for positioning the welder within the coil on a gimble axis mount for proper access to the entire inner coil surface. Welding tips are selectively held against the welding surface by an extensible guide and engagement assembly.

7 Claims, 3 Drawing Sheets

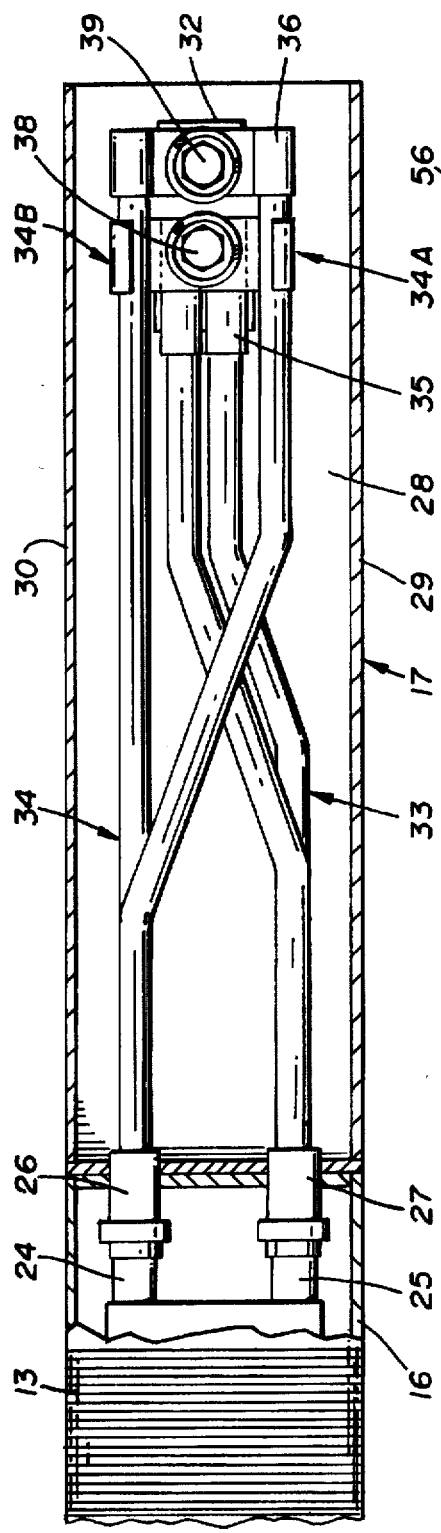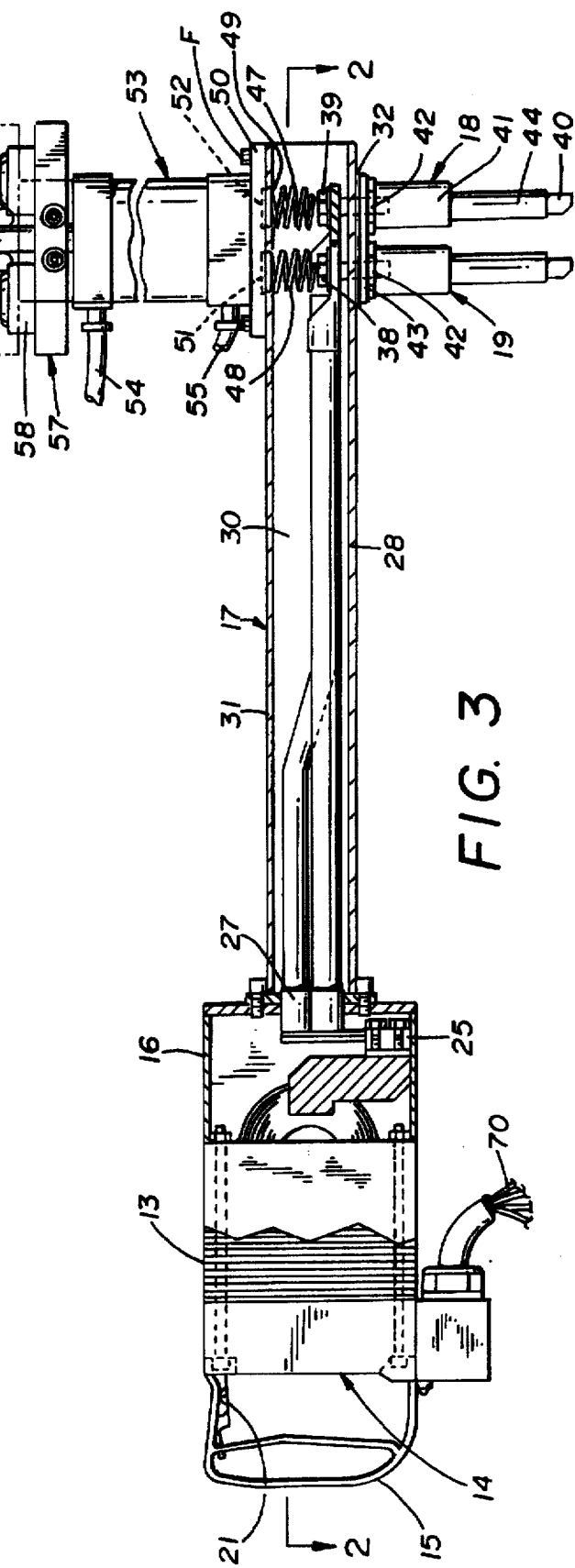

5,705,782

1

INTERNAL COIL SPOT WELDING DEVICE

BACKGROUND OF THE INVENTION

1. Technical Field

This invention relates to welding tools used to weld material together. Such tools are used extensively for spot welding to secure two overlying materials to one another.

2. Description of Prior Art

Prior art welding tools have been hand held or supported from counter balance support brackets and/or more typically positioned on the ends of robot arms used in the manufacturing plants. Heretofore, welding has been used to weld the ends of coiled steel to itself, both internally and externally when the coils are to be treated such as during an annealing process or other related processes. It has always been a problem to obtain good holding welds on the inside surface of a coil due to the limited size of the coil opening by welding since it is difficult to obtain proper pressure of the welding tips while holding the welding gun at arm's length within the coil opening.

Prior art devices have relied on hand held welding tools well known to those skilled in the art. The requirement for securing the inside end of the coil to itself is most evidenced as noted above in the annealing process, for example, as the coils are heated the coil does not heat uniformly which causes movement of the coil on itself thus marring the coil surface. If the coil can be held together, the coil will not move, see for example U.S. Pat. No. 3,294,598 wherein a coil is wound tightly and held by a plurality of banding strips.

In U.S. Pat. No. 2,495,561 a method and apparatus for heating coil strip materials is disclosed wherein a coil support plate is used with multiple spot welds to secure the outside end of the coil strip to be coiled and binding straps.

In U.S. Pat. No. 3,517,917 plates are used to restrain the coil core against outward movement during annealing.

In U.S. Pat. No. 1,870,577 a coil is mounted in a tight coiled configuration by a plurality of tie wires thereabout.

In U.S. Pat. No. 3,319,948 uses a box to hold multiple coils stacked together to be annealed.

SUMMARY OF THE INVENTION

An internal coiled welding device for securing the end of a coil strip to itself. The welding device is self-supporting with an external self-supporting main body member with remote mounting welding tips. A pneumatic cylinder assembly applies proper weld tip engagement pressure by expanding within the coil. The internal coil welding device is rotatable about its longitudinal axis from a rotatable support arm mounting which allows the welding tips to be positioned anywhere within the inner core of the coil opening so as to conform with the position of the end of the coil strip within the coils core.

DESCRIPTION OF THE DRAWINGS

FIG. 2 is an enlarged partial cross-sectional view on lines 2—2 of FIG. 3;

FIG. 3 is a partial cross-sectional side elevational view of the welding tool;

2

Figure 6:
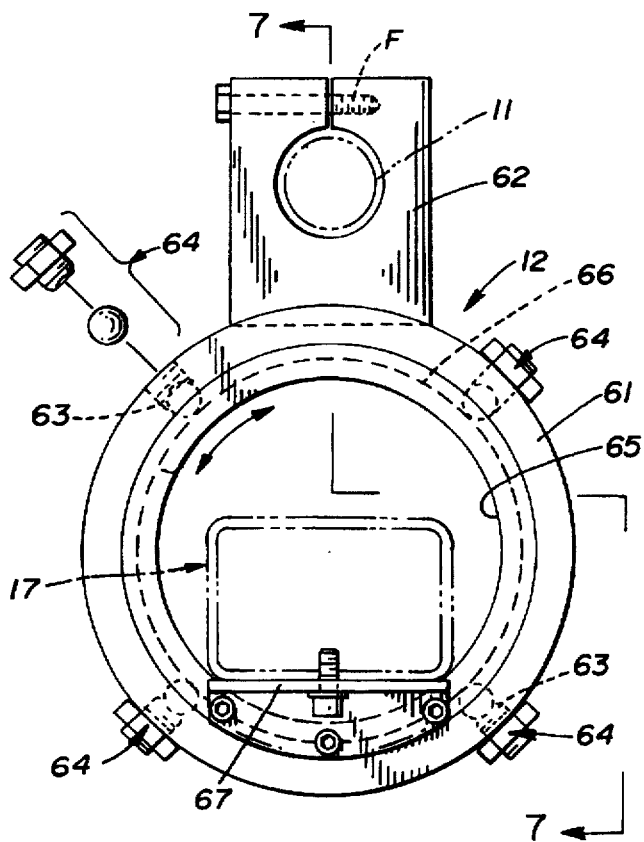

FIG. 6 is an enlarged front plan view of a rotational mounting bracket; and

Figure 7:
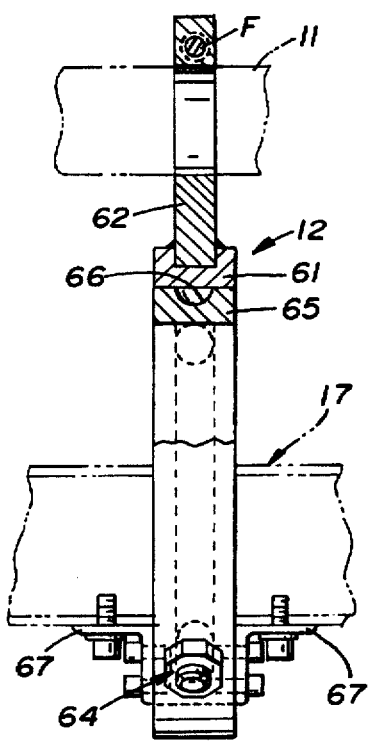

FIG. 7 is a partial cross-sectional view on lines 7—7 in FIG. 6.

DESCRIPTION OF THE PREFERRED EMBODIMENTS

Figure 1:
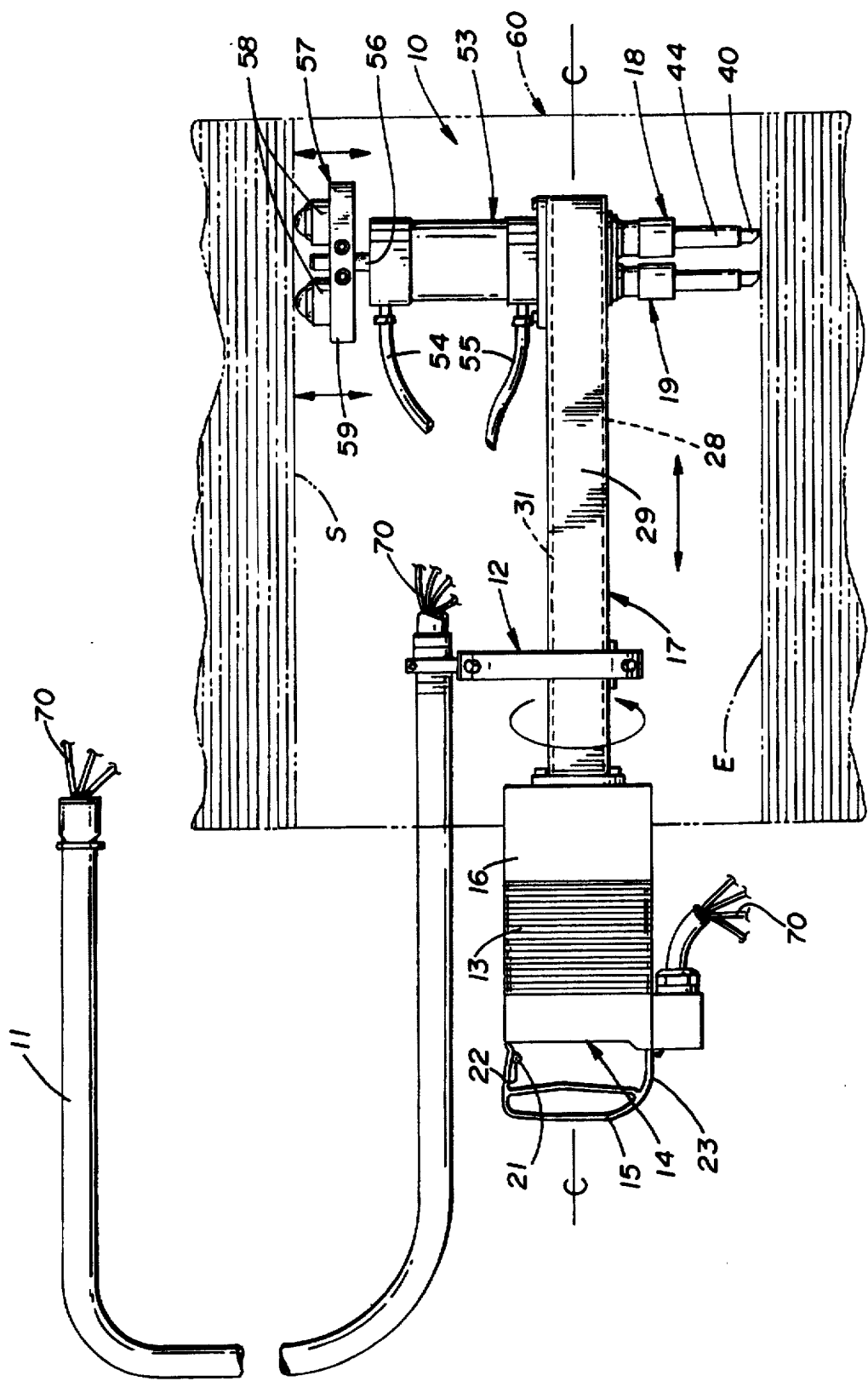
FIG. 1 is a side elevational view of the welding tool of the invention within a coil shown in broken lines during use.

Referring to FIGS. 1–3 of the drawings, a coil welding tool 10 can be seen mounted to an articulated support bracket 11 by a gimble mount assembly 12. The welding tool 10 has a welding power transformer assembly 13 and a micro-switch assembly 14 with a handle 15 thereon. A front enclosed housing 16 extends from the transformer 13 defining a mounting area for a tip extension arm 17 having a pair of welding tip assemblies 18 and 19 mounted inwardly of its free end. The power transformer 13 and micro-switch assembly 14 are both commercially available components typically associated with welding guns and manufactured in this example by Airomac Corporation with the transformer model no. 898-187 and micro-switch assembly model no. 698-193.

The handle 15 of the micro-switch and transformer assembly hereinbefore described is of a flat metal band configuration extending from the micro-switch assembly 14. A switch activation trigger 21 is positioned between upper and lower portions of the handle 22 and 23 respectively.

Figure 4:
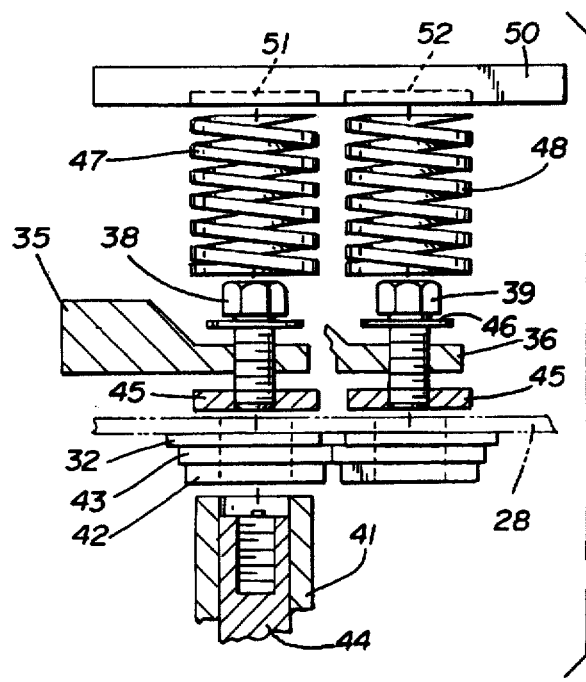
FIG. 4 is an enlarged exploded partial cross-sectional view of a portion of the weld tip assembly.

The welding transformer assembly 13 has output connections 24 and 25 to which cable terminals 26 and 27 are secured and extend through multiple openings in the housing 16. The extension arm 17 defines a cross-sectionally rectangular configuration having a bottom 28, oppositely disposed integral sidewalls 29 and 30 and a interconnecting top 31. The welding tip assemblies 18 and 19 extend from the extensible arm through an access plate 32 on the bottom 28 thereof, best seen in FIG. 4 of the drawings.

Figure 5:
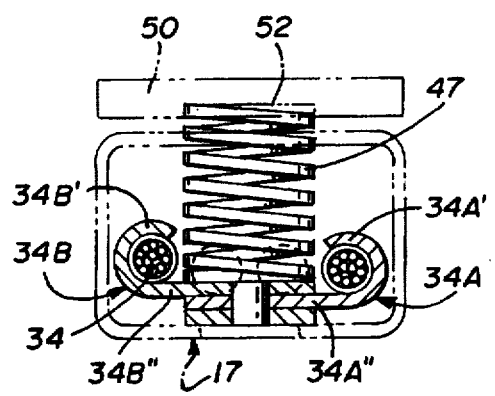
FIG. 5 is an enlarged cross-sectional view of a cable support and spacing bracket.

Multiple power cable pairs 33 and 34 extend from the respective cable terminals 26 and 27 through the extension arm 17 to the welding tip assemblies 18 and 19. Each of the cable pairs 33 and 34 are connected to respective cable termination lugs 35 and 36 each having two cable attachment points which in turn are attached to their respective welding tip assemblies 18 and 19 by respective tip bolts 38 and 39. The cable pair 34 is engaged in cable guides 34A and 34B, best seen in FIGS. 2 and 5 of the drawings having a curved upstanding end cable engagement portion 34A' and 34B' and a apertured base portion 34A" and 34B" that holds and separates the cable pair into cable lugs 36 as hereinbefore described. Each welding tip assembly has a welding tip 40, a guide sleeve 41 and an assembly nut 42 with plastic insulators 43 and a threaded tip holder 44 that receives the respective tip bolts 38 and 39, best seen in FIG. 4 of the drawings.

The tip bolts 38 and 39 have plated spacers 45 and washer 46 engaged on the respective cable lugs 35 and 36 best seen in FIG. 2 of the drawings.

Referring back now to FIGS. 3 and 4 of the drawings, springs 47 and 48 are positioned over the respective tip bolts 38 and 39 extending through apertures 49 in the top 31 of the tip arm 17. A cylinder mounting plate 50 having spring receiving pockets 51 and 52 therein is secured to the top 31 of the arm 17 by multiple fasteners F.

A pneumatic piston and cylinder assembly 53 extends from the cylinder mounting plate 50 having typical fluid inlet and outlet lines 54 and 55 which are connected to a source of fluid under pressure, not shown, as will be well understood by those skilled in the art.

A piston rod 56 of the piston and cylinder assembly 53 extends outwardly therefrom and has a surface engagement assembly 57 secured thereto. The surface engagement assembly 57 has a pair of longitudinally spaced upstanding bearing assemblies 58 extending from a mounting plate 59 of the assembly which is movable from a first position adjacent said piston and cylinder assembly 53 to a second position, an adjustable defined position (illustrated in broken lines in FIG. 3 of the drawings, and solid lines in FIG. 1 of the drawings) so that the bearing assembly 58 engages an inner surface S of a coil of steel 60 shown in broken lines.

Referring now to FIGS. 1, 6, and 7 of the drawings, the gimble mounting assembly 12 can be seen having an annular outer support ring 61 with a split mounting fixture 62 extending therefrom engageable on the support bracket 11 by a compression fastener F. The outer support ring 61 has a number of oppositely disposed mounting apertures 63 therein for receiving bearing assemblies 64 therein, best seen in FIG. 6 of the drawings.

An inner support ring 65 has a grooved annular perimeter outer surface 66 rotatably positioned within the outer support ring 61 by registration with said bearing assemblies 64.

A mounting bracket 67 is secured to the inner support ring 65 for securing same onto the extension arm 17 extending therethrough.

It will be evident that the extension arm 17 thus mounted within the gimble mounting bracket assembly 12 is freely rotatable about its longitudinal center axis C which allows the welding tips 40 of the respective welding tip assemblies 18 and 19 to be rotatably positioned within the steel coil 60 to any desirable engagement position therein as generally illustrated in FIG. 1 of the drawings.

It will also be evident to those skilled in the art that a source of power for the welding transformer is available and connected to the transformer through a power cable 70 extending through the support bracket 11 to the inlet fitting 62 on the micro-switch assembly 14.

In operation, the coil welding tool 10 is moved within the steel coil 60 on its articulated support bracket 11 that extends above the coil to a overhead point of attachment, not shown, and is rotatable within the gimble mount assembly 12 to align the welding tips 40 with a coil end E of the coil 60. The pneumatic cylinder 53 extends the surface engagement assembly 57 with its associated bearing assemblies 58 from its first position to the second adjustable position against the inside surface S of the coil and the welding tips 40 which are spring urged against the surface to be welded by respective springs 47 and 48. This arrangement allows the welding tool 10 to be easily and quickly positioned within the coil 60 and to adjust to the inner coil surfaces in providing proper contact with the welding tips 40 for precise welding of the end portion of the coil E as hereinbefore described.

As the welding tool 10 is engaged for welding, the respective welding tips assemblies 18 and 19 are spring-urged against the coil surface as noted above by the respective springs 47 and 48 providing constant vertical tip adjustment as the welding tips 40 are consumed during use.

Thus, it will be seen that a new and novel power welding tip assembly device has been illustrated and described and it will be apparent to those skilled in the art that various changes and modifications may be made therein without departing from the spirit of the invention.

Therefore I claim:

1. A coil welding tool to be positioned within a coil of steel or the like for securing the coil's end to the coil comprises; a power transformer and a switch assembly, an extension arm extending from said power transformer, welding tip assemblies in said extension arm and said welding tips interconnected with said power transformer and a source of power, a tool support extending from said welding tool to a remote attachment point, means for rotating said welding tool on its longitudinal axis in relation to said tool support and means for selective engagement of said welding tip assemblies within said coil.

2. The coil welding tool of claim 1 wherein said extension arm is tubular and said welding tips are resiliently positioned within said arm.

3. The coil welding tool of claim 1 wherein said welding tips are interconnected to said power transformer by pairs of power cables between cable terminals on said power transformer and cable lugs on said welding tips.

4. The coil welding tool of claim 1 wherein said tool support comprises a contoured support bracket.

5. The coil welding tool of claim 1 wherein said means for rotating said welding tool on its longitudinal axis comprises; an outer annular support ring and a movable inner support ring, said inner support ring secured to said tool.

6. The coil welding tool of claim 5 wherein said outer annular support ring has bearing means interconnecting said inner support ring.

7. The coil welding tool of claim 1 wherein said means for selectively engaging said welding tip assemblies comprises; a cylinder and piston assembly secured to said extension arm opposite said welding tip assemblies, a piston rod extending from said piston and cylinder assembly, a coil engagement bearing assembly on said piston arm, and a source of fluid pressure connected to said cylinder and piston assembly.

* * * * *